(12) United States Patent
Nakazawa

(10) Patent No.: US 11,228,692 B2
(45) Date of Patent: Jan. 18, 2022

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Toshiya Nakazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/726,919

(22) Filed: Dec. 25, 2019

(65) Prior Publication Data

US 2020/0344372 A1 Oct. 29, 2020

(30) Foreign Application Priority Data

Apr. 23, 2019 (JP) .............................. JP2019-081596

(51) Int. Cl.
| | |
|---|---|
| *H04N 1/00* | (2006.01) |
| *G06F 21/60* | (2013.01) |
| *H04N 1/44* | (2006.01) |
| *G06F 21/00* | (2013.01) |
| *G06F 21/45* | (2013.01) |

(52) U.S. Cl.
CPC ....... *H04N 1/00856* (2013.01); *G06F 21/608* (2013.01); *H04N 1/00864* (2013.01); *H04N 1/4406* (2013.01); *G06F 21/00* (2013.01); *G06F 21/45* (2013.01)

(58) Field of Classification Search
CPC .......... H04N 1/00856; H04N 1/00864; H04N 1/4406; G06F 21/608; G06F 21/45; G06F 21/00
USPC ........................................................ 358/1.14
See application file for complete search history.

(56) References Cited

U.S. PATENT DOCUMENTS

| | | | |
|---|---|---|---|
| 6,178,415 B1 * | 1/2001 | Amou | ................. G06F 16/3322 |
| 8,561,128 B2 | 10/2013 | Hirahara | |
| 2002/0120855 A1 * | 8/2002 | Wiley | ................... G06F 21/608 |
| | | | 713/189 |
| 2004/0133794 A1 * | 7/2004 | Kocher | ................. H04L 9/3236 |
| | | | 713/193 |

(Continued)

FOREIGN PATENT DOCUMENTS

| | | |
|---|---|---|
| JP | 2002251921 | 9/2002 |
| JP | 2004094401 | 3/2004 |

(Continued)

*Primary Examiner* — Miya J Williams
*Assistant Examiner* — Darryl V Dottin
(74) *Attorney, Agent, or Firm* — JCIPRNET

(57) ABSTRACT

An information processing apparatus includes a reception unit that receives a transmission request for image data from an image processing apparatus to which a user provides an instruction to execute image processing, an acquisition unit that acquires a security policy corresponding to attribute information related to an attribute of the image processing apparatus in a case where the reception unit receives the transmission request, and a control unit that performs control for transmitting the image data to the image processing apparatus and executing the image processing in the image processing apparatus in accordance with the security policy acquired by the acquisition unit.

10 Claims, 6 Drawing Sheets

(56) References Cited

U.S. PATENT DOCUMENTS

2013/0042298 A1* 2/2013 Plaza Fonseca ........ H04L 41/12
726/1
2013/0293696 A1* 11/2013 Chang .................... H04N 7/183
348/79
2017/0302822 A1* 10/2017 Vandeweerd ........ H04N 1/2137

FOREIGN PATENT DOCUMENTS

| JP | 2006286886 | 10/2006 |
| JP | 2008102871 | 5/2008 |

* cited by examiner

| No | SECURE INSTALLATION LOCATION OF IMAGE PROCESSING APPARATUS |
|---|---|
| 1 | LATITUDE OF a1 DEGREES, b1 MINUTES, AND c1 SECONDS<br>LONGITUDE OF d1 DEGREES, e1 MINUTES, AND f1 SECONDS |
| 2 | LATITUDE OF a2 DEGREES, b2 MINUTES, AND c2 SECONDS<br>LONGITUDE OF d2 DEGREES, e2 MINUTES, AND f2 SECONDS |
| ⋮ | ⋮ |

| NON-SPECIFYING PROCESS | INSTRUCTION |
|---|---|
| CONCEAL NAME OF USER | OFF |
| CONCEAL NAME OF IMAGE DATA | OFF |
| PRINT BY DIRECTING PRINTING SURFACE DOWNWARD | OFF |
| DO NOT OUTPUT OPERATION SOUND | OFF |
| ⋮ | ⋮ |

| NON-SPECIFYING PROCESS | INSTRUCTION |
|---|---|
| CONCEAL NAME OF USER | ON |
| CONCEAL NAME OF IMAGE DATA | ON |
| PRINT BY DIRECTING PRINTING SURFACE DOWNWARD | ON |
| DO NOT OUTPUT OPERATION SOUND | ON |
| ⋮ | ⋮ |

| DEFAULT POLICY | PRIORITY |
|---|---|
| USER | 1 |
| LOGICAL PRINTER | 2 |
| INSTALLATION LOCATION | 3 | ns
INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2019-081596 filed Apr. 23, 2019.

BACKGROUND

(i) Technical Field

The present invention relates to an information processing apparatus and a non-transitory computer readable medium storing an information processing program.

(ii) Related Art

JP2008-102871A discloses a document management system that manages access to a file. The document management system includes selection means for selecting a virtual security policy that is prepared for each device and is to be set on the file, acquisition means for acquiring access permission information determining a permission enabling access to the file based on the virtual security policy selected by the selection means and authentication information of a setter setting the virtual security policy, conversion means for converting the virtual security policy into an actual security policy interpretable in common in the document management system based on the access permission information acquired by the acquisition means, and management means for setting the actual security policy converted by the conversion means on the file and managing access to the file.

JP2004-094401A discloses a security policy distribution system that manages a security policy applied in common to plural different types of apparatuses and an application destination of the security policy in a management apparatus, and notifies an apparatus as the application destination of distribution of the security policy from the management apparatus in a case where the security policy is distributed from the management apparatus. The apparatus as the application destination that is notified of the distribution of the security policy accesses the management apparatus from the apparatus as the application destination in order to acquire the security policy. An apparatus that needs the security policy actively acquires the security policy from the management apparatus at the time of start-up and performs access control using the acquired security policy.

SUMMARY

In a case where an image processing apparatus is not in a safe situation such as a situation in which the image processing apparatus to which an instruction to execute image processing is provided by a user is installed at a location that is not a safe environment for the user, the image processing needs to be executed using a stricter security policy than a case where the image processing is executed by the image processing apparatus in a safe situation. In this case, causing the user to select the security policy burdens the user.

Aspects of non-limiting embodiments of the present disclosure relate to an information processing apparatus and a non-transitory computer readable medium storing an information processing program capable of applying a security policy corresponding to a situation of an image processing apparatus and causing the image processing apparatus to execute image processing without causing a user to select the security policy.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a reception unit that receives a transmission request for image data from an image processing apparatus to which a user provides an instruction to execute image processing, an acquisition unit that acquires a security policy corresponding to attribute information related to an attribute of the image processing apparatus in a case where the reception unit receives the transmission request, and a control unit that performs control for transmitting the image data to the image processing apparatus and executing the image processing in the image processing apparatus in accordance with the security policy acquired by the acquisition unit.

BRIEF DESCRIPTION OF THE DRAWINGS

Exemplary embodiment(s) of the present invention will be described in detail based on the following figures, wherein:

FIG. 5 is a diagram illustrating one example of an installation location list;

FIG. 6 is a diagram illustrating one example of security policy information;

FIG. 7 is a diagram illustrating one example of the security policy information; and FIG. 8 is a diagram illustrating one example of priority information.

DETAILED DESCRIPTION

Hereinafter, an exemplary embodiment of the present invention will be described in detail with reference to the drawings.

Figure 1:
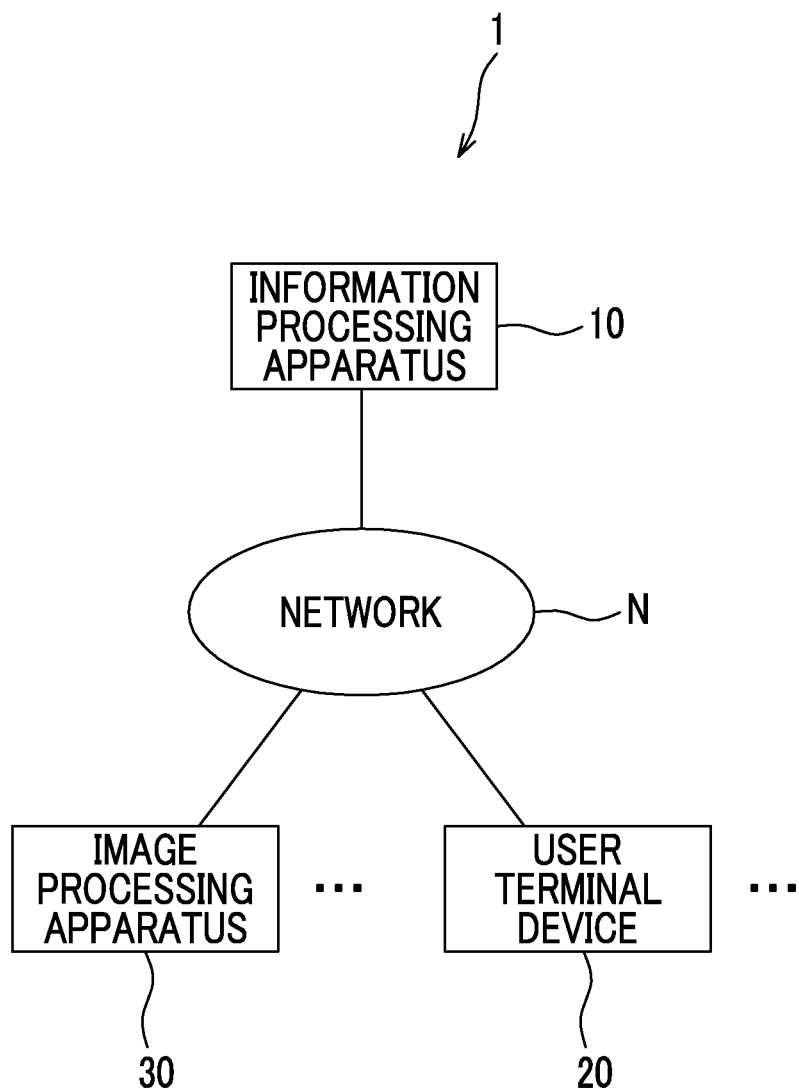
FIG. 1 is a schematic configuration diagram illustrating a configuration of an information processing system.

FIG. 1 is a configuration diagram of an information processing system 1. The information processing system 1 is configured to be connected from an information processing apparatus 10, plural user terminal devices 20, and plural image processing apparatuses 30 through a network N.

In a case where a user provides an instruction to perform image processing on image data, first, the user transmits the image data to the information processing apparatus 10 from the user terminal device 20 by operating the user terminal device 20. The image data is data that includes at least one of a text or an image. The image processing is a process performed on the image data. For example, the image processing is exemplified by an output process and an analysis process with respect to the image data. Specifically, for example, the output process with respect to the image data is exemplified by a printing process of printing the image data, a process of transmitting the image data by fax, and a process of transmitting the image data by email. The analysis process with respect to the image data is exemplified by an optical character recognition (OCR) process and the like with respect to the image data. In the present exemplary embodiment, a case where the image processing is the printing process will be described. That is, in the present exemplary embodiment, the information processing apparatus 10 functions as a print server, and the image processing apparatus 30 functions as a printer.

The information processing apparatus 10 functions as a logical image processing apparatus that receives and stores the image data transmitted from the user terminal device 20. In a case where the image processing is the printing process, the information processing apparatus 10 generates and stores data for printing the image data by the image processing apparatus 30 as a printer. That is, in the present exemplary embodiment, the information processing apparatus 10 functions as a logical printer.

The user provides the instruction to perform the image processing by operating the image processing apparatus 30 that is to execute the image processing on the image data transmitted to the information processing apparatus 10. Accordingly, the image processing apparatus 30 receives the image data from the information processing apparatus 10 and executes the image processing of the instruction provided by the user, that is, the printing process.

Figure 2:
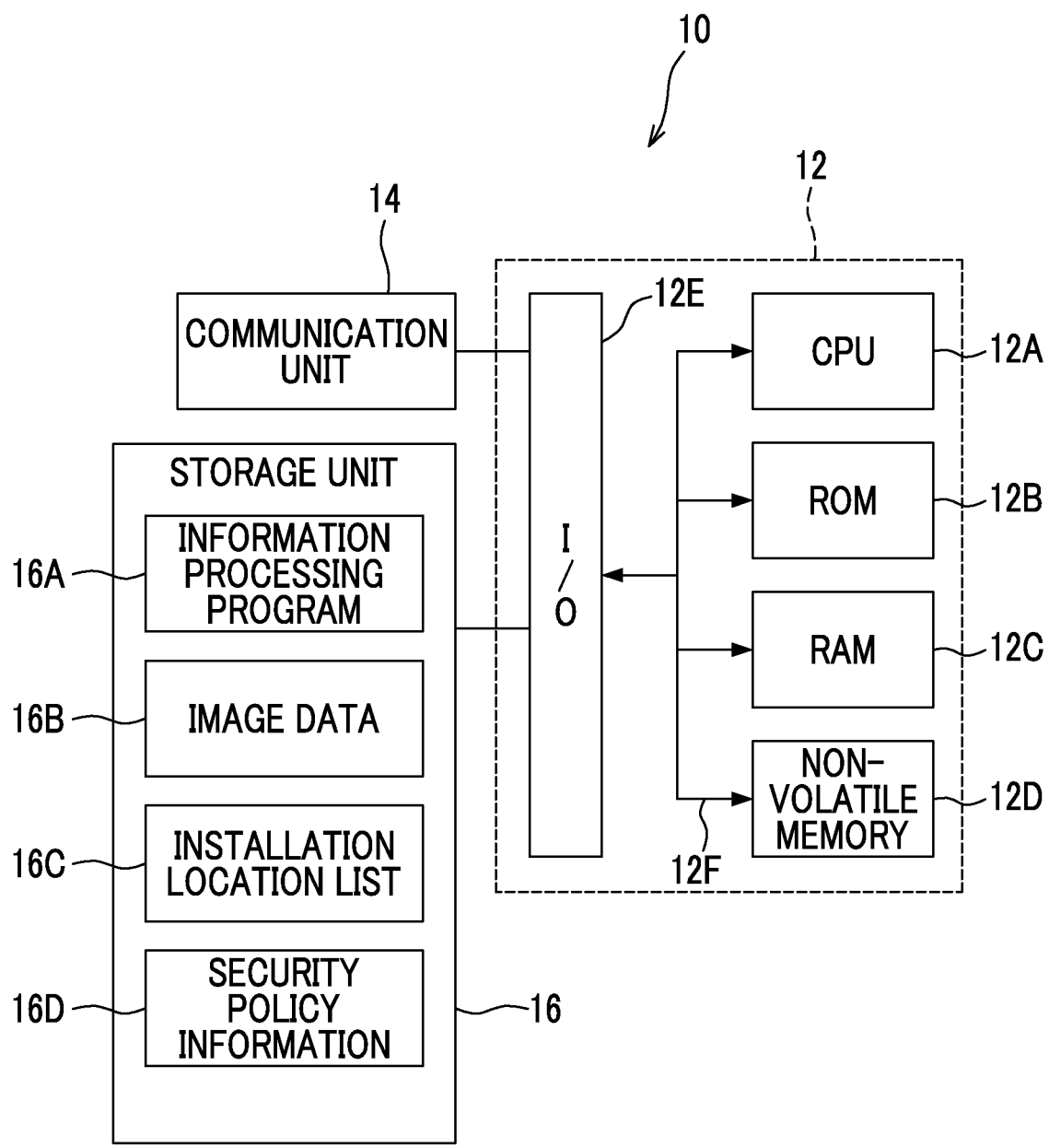
FIG. 2 is a block diagram illustrating a main configuration of an electrical system of an information processing apparatus.

FIG. 2 is a configuration diagram of the information processing apparatus 10. The information processing apparatus 10 is configured as an apparatus including a general computer.

As illustrated in FIG. 2, the information processing apparatus 10 includes a controller 12. The controller 12 includes a central processing unit (CPU) 12A, a read only memory (ROM) 12B, a random access memory (RAM) 12C, a non-volatile memory 12D, and an input-output interface (I/O) 12E. The CPU 12A, the ROM 12B, the RAM 12C, the non-volatile memory 12D, and the I/O 12E are connected to each other through a bus 12F.

A communication unit 14 and a storage unit 16 are connected to the I/O 12E.

The communication unit 14 is an interface for performing data communication with an external apparatus.

The storage unit 16 is configured as a non-volatile storage device such as a hard disk and stores an information processing program 16A, image data 16B, an installation location list 16C, security policy information 16D, and the like described later. The CPU 12A reads and executes the information processing program 16A stored in the storage unit 16.

Next, a functional configuration of the CPU 12A in a case where the information processing apparatus 10 executes the information processing program 16A will be described.

Figure 3:
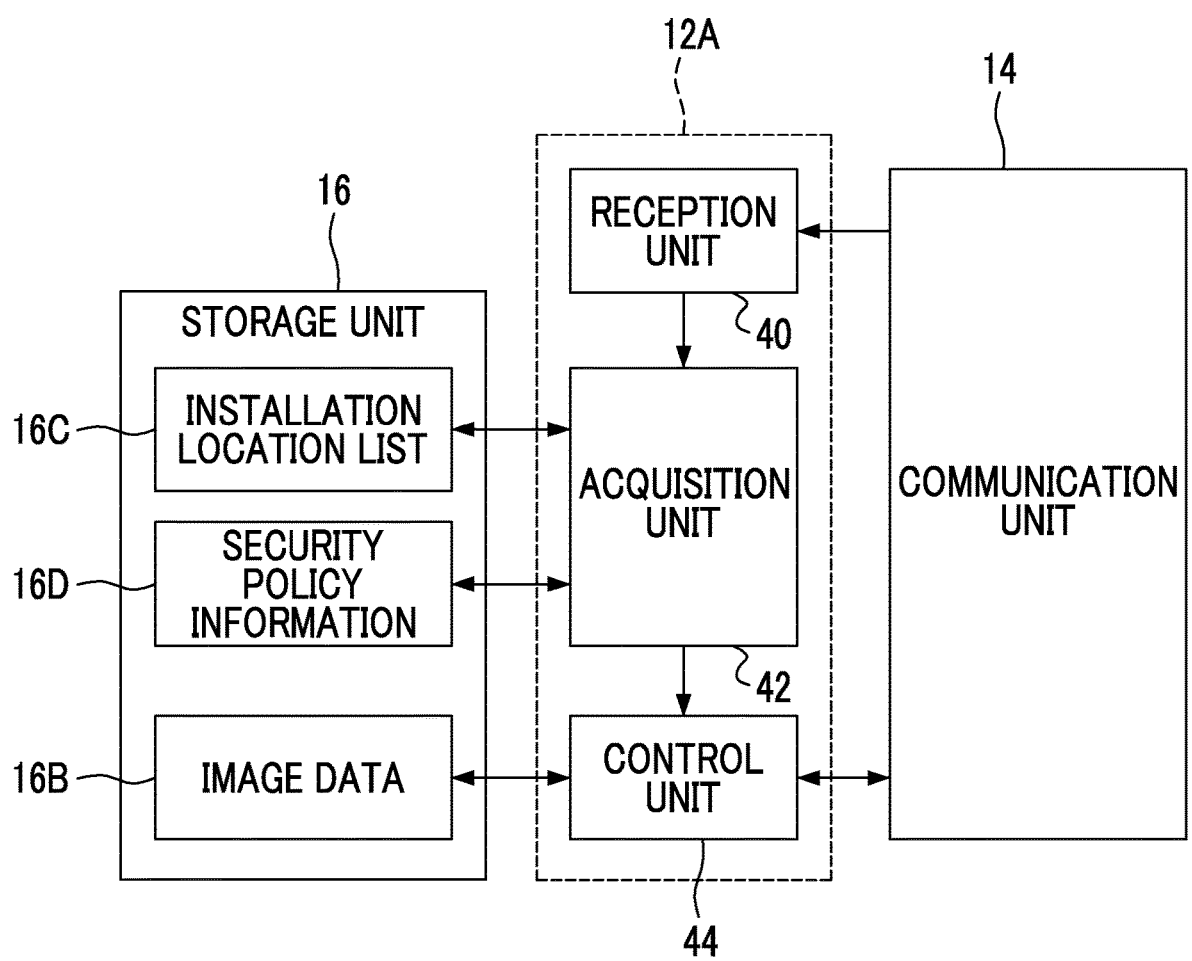
FIG. 3 is a block diagram illustrating a functional configuration of the information processing apparatus.

As illustrated in FIG. 3, the CPU 12A functionally includes a reception unit 40, an acquisition unit 42, and a control unit 44.

The reception unit 40 receives a transmission request for the image data from the image processing apparatus 30 to which the user provides the instruction to execute the image processing.

In a case where the reception unit 40 receives the transmission request for the image data, the acquisition unit acquires a security policy corresponding to attribute information related to an attribute of the image processing apparatus 30. The attribute information is information representing features related to the security policy of the image processing apparatus 30. For example, the attribute information includes information related to at least one of an installation environment of the image processing apparatus 30 or a relationship between the user and the image processing apparatus 30. Specifically, for example, the information related to the installation environment is information representing an installation location of the image processing apparatus 30 but is not limited thereto. The information representing the installation location is exemplified by global positioning system (GPS) information of the installation location, that is, information of a latitude and a longitude. In addition, for example, the information related to the relationship between the user and the image processing apparatus 30 is information representing whether or not the image processing apparatus is installed at an affiliation destination of the user, but is not limited thereto. The affiliation destination is an organization to which the user belongs and is specifically, for example, a company or an affiliation department.

The security policy is a definition of measures related to security in a case where the image processing is performed on the image data. For example, the security policy is a security policy for providing an instruction to perform a predetermined process for preventing at least one of the user or the image data from being specified. In this case, for example, the predetermined process is a process of transmitting information related to the image data to the image processing apparatus 30 excluding specifying information that leads to specifying of at least one of the user or the image data, but is not limited thereto. For example, the specifying information is information that includes at least one of the name of the user or the name of the image data, but is not limited thereto.

The predetermined process may be a non-specifying process of outputting a processing result of the image processing in a form in which at least one of the user or the image data is not specified. In this case, for example, the non-specifying process may be a process of concealing at least one of the name of the user or the name of the image data on a display unit of the image processing apparatus 30.

Alternatively, the predetermined process may be a process of preventing information related to at least one of the user or the image data from being stored in the image processing apparatus 30.

The control unit 44 transmits the image data to the image processing apparatus 30 and performs control for executing the image processing in the image processing apparatus 30 in accordance with the security policy acquired by the acquisition unit 42. Specifically, an image processing instruction in accordance with the security policy acquired by the acquisition unit 42 is transmitted to the image processing apparatus 30. Accordingly, the image processing apparatus 30 executes the image processing on the image data in accordance with the image processing instruction transmitted from the information processing apparatus 10. Accordingly, the security policy corresponding to the situation of the image processing apparatus 30 is applied without causing the user to select the security policy, and the image processing is executed.

The acquisition unit 42 may acquire a default security policy of at least one of a first default security policy that is set in advance with respect to the user, or a second default security policy that is set in advance with respect to the logical image processing apparatus receiving the image data transmitted from the user. In addition, the control unit 44 may generate a new security policy from the default security policy acquired by the acquisition unit 42 and the security policy corresponding to the attribute information. In this case, priorities are set in advance on the security policy corresponding to the attribute information, the first default security policy, and the second default security policy, and the control unit 44 may generate a new security policy in accordance with the priorities.

Figure 4:
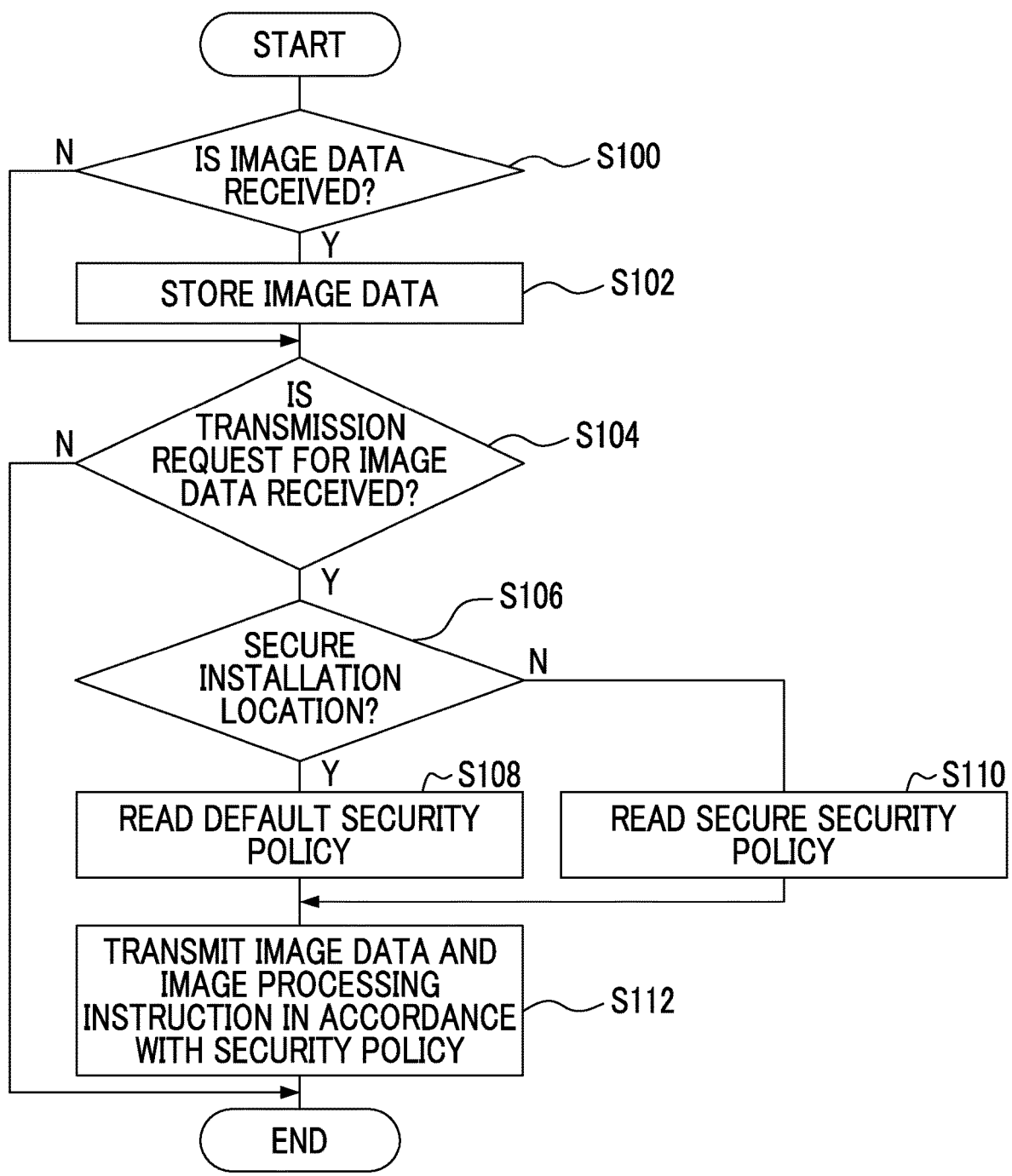
FIG. 4 is a flowchart illustrating one example of a flow of information processing.

Next, an effect of the information processing apparatus 10 according to the present exemplary embodiment will be described. As illustrated in FIG. 2, the information processing program 16A is stored in the storage unit 16. Information processing illustrated in FIG. 4 is executed by causing the CPU 12A to read and execute the information processing program 16A. The information processing illustrated in FIG. 4 is executed each time the image data is received or the transmission request for the image data is received.

In a case where the user desires to print the image data by the image processing apparatus 30, the user transmits the image data to the information processing apparatus 10 from the user terminal device 20 by operating the user terminal device 20.

Therefore, in step S100, a determination as to whether or not the image data is received from the user terminal device 20 is performed. In a case where the image data is received from the user terminal device 20, a transition is made to step S102. In a case where the image data is not received, a transition is made to step S104.

In step S102, data for printing the image data received in step S100 by the image processing apparatus 30 is generated and is stored in the storage unit 16 as the image data 16B.

The user provides an instruction to print the image data by operating the image processing apparatus 30 by which the user desires to print the image data. In a case where the instruction to print the image data is provided, the image processing apparatus 30 requests the information processing apparatus 10 to transmit the image data for which the instruction to print is provided. Specifically, the image processing apparatus 30 transmits information such as a file name as information for specifying the image data for which the instruction to print is provided, and information for specifying the installation location of the image processing apparatus 30, for example, the GPS information, to the information processing apparatus 10 as the transmission request. Not only the GPS information but also an identification ID or the like that is uniquely assigned to the image processing apparatus 30 may be used as information for specifying the image processing apparatus 30, as long as the information uniquely specifies the image processing apparatus 30.

In step S104, a determination as to whether or not the transmission request for the image data is received from the image processing apparatus 30 is performed. In a case where the transmission request for the image data is received from the image processing apparatus 30, a transition is made to step S106. In a case where the transmission request for the image data is not received from the image processing apparatus 30, the present routine is finished.

In step S106, a determination as to whether or not the installation location of the image processing apparatus 30 as a transmission source of the transmission request received in step S104 is a secure installation location is performed. Specifically, the determination as to whether or not the installation location is secure is performed by referring to the secure installation location list 16C stored in the storage unit 16 and determining whether or not a latitude and a longitude matching the latitude and the longitude represented by the GPS information included in the transmission request received in step S104 are registered in the installation location list 16C. FIG. 5 illustrates one example of the installation location list 16C. As illustrated in FIG. 5, the installation location list 16C is a list of information of latitudes and longitudes of secure installation locations.

In a case where the latitude and the longitude matching the latitude and the longitude represented by the GPS information included in the transmission request received in step S104 are registered in the installation location list 16C, it is determined that the installation location of the image processing apparatus 30 as the transmission source of the transmission request received in step S104 is a secure installation location. In a case where the latitude and the longitude matching the latitude and the longitude represented by the GPS information included in the transmission request received in step S104 are not registered in the installation location list 16C, it is determined that the installation location of the image processing apparatus 30 as the transmission source of the transmission request received in step S104 is not a secure installation location.

In a case where the installation location of the image processing apparatus 30 as the transmission source of the transmission request received in step S104 is a secure installation location, a transition is made to step S108. In a case where the installation location of the image processing apparatus 30 as the transmission source of the transmission request received in step S104 is not a secure installation location, a transition is made to step S110.

A secure installation location refers to an installation location where, in a case where the image processing is executed on the image data, there is no concern about leaking of information related to the image data to a third party that is not related to the user providing the instruction to execute the image processing on the image data. For example, it is assumed that the user providing the instruction to execute the image processing on the image data is an employee of A company, and the image processing apparatus 30 to which the instruction to execute the image processing on the image data is provided is installed in A company. In this case, it may be said that there is no concern about leaking of information related to the image data to a third party not related to the user providing the instruction to execute the image processing on the image data. Thus, the image processing apparatus 30 to which the instruction to execute the image processing on the image data is provided is said to be an image processing apparatus that is installed at a secure installation location. On the other hand, it is assumed that the image processing apparatus 30 to which the instruction to execute the image processing on the image data is provided is installed at a public location such as a convenience store. In this case, it may be said that there is concern about leaking of information related to the image data to a third party not related to the user providing the instruction to execute the image processing on the image data. Thus, the image processing apparatus 30 to which the instruction to execute the image processing on the image data is provided is said to be an image processing apparatus that is installed at an insecure installation location.

In step S108, the default security policy is read from the security policy information 16D stored in the storage unit 16. The default security policy is a security policy that is to be applied in a case where the image processing apparatus 30 is at a secure installation location.

FIG. 6 illustrates a default security policy 16D1 as one example. As illustrated in FIG. 6, in the default security policy 16D1, an instruction for the non-specifying process of outputting the processing result of the image processing in a form in which at least one of the user or the image data is not specified is defined. The image processing apparatus 30 executes the non-specifying process for which the instruction is "ON", and does not execute the non-specifying process for which the instruction is "OFF".

In the example in FIG. 6, "conceal the name of the user", "conceal the name of the image data", "print by directing a printing surface downward", "do not output operation sound", and the like are defined as the non-specifying process. The instruction for each non-specifying process is set to "OFF". Thus, while the name and the like of the image data may be seen by another person, problems do not arise since the image processing apparatus 30 processing the image data is present at a secure installation location.

In step S110, a secure security policy is read from the security policy information 16D stored in the storage unit 16. A secure security policy is a security policy for an insecure installation location. A policy that is stricter than the default security policy is defined as a secure security policy.

FIG. 7 illustrates a secure security policy 16D2 as one example. As illustrated in FIG. 7, in the secure security policy 16D2, the instruction for each non-specifying process is set to "ON". That is, since the image processing apparatus processing the image data is present at an insecure installation location, the non-specifying process such as concealing the name of the image data is executed. Accordingly, the possibility of another person seeing the name and the like of the user is decreased.

In step S112, the image data for which the transmission request is received from the image processing apparatus 30 is read from the image data 16B stored in the storage unit 16. The read image data and the image processing instruction in accordance with the security policy read in step S108 or step S110 are transmitted to the image processing apparatus 30.

Accordingly, the image processing apparatus 30 processes the image data in accordance with the security policy transmitted from the information processing apparatus 10.

In a case where there is a transmission request for the image data from the image processing apparatus 30, the information processing apparatus 10 according to the present exemplary embodiment acquires the security policy corresponding to the installation location of the image processing apparatus 30 and transmits the image processing instruction in accordance with the security policy to the image processing apparatus 30. Thus, the user does not need to select the security policy, and the image processing is executed in accordance with the security policy corresponding to the installation location of the image processing apparatus 30.

In the present exemplary embodiment, a case where the image processing instruction in accordance with the security policy in which the instruction for the non-specifying process as illustrated in FIGS. 6 and 7 is defined is transmitted to the image processing apparatus 30 by the information processing apparatus 10, and the image processing apparatus 30 executes the image processing on the image data in accordance with the received image processing instruction is described. However, the case is not for limitation purposes. For example, as the predetermined process for preventing at least one of the user or the image data from being specified, the information processing apparatus 10 may execute a process of transmitting information related to the image data to the image processing apparatus 30 excluding information that includes, for example, at least one of the name of the user or the name of the image data. Accordingly, leakage of the name and the like of the user to a third party is reduced.

In addition, as the predetermined process for preventing at least one of the user or the image data from being specified, the information processing apparatus 10 may include, in the image processing instruction to be transmitted to the image processing apparatus 30, an instruction to execute a process of preventing information related to at least one of the user or the image data from being stored in the image processing apparatus 30. Accordingly, information related to at least one of the user or the image data is not stored after the image processing is executed by the image processing apparatus 30, and there is no concern about leaking information related to at least one of the user or the image data.

In the present exemplary embodiment, a case where the security policy corresponding to the installation location of the image processing apparatus 30 is acquired, and the image processing instruction in accordance with the security policy is transmitted to the image processing apparatus 30 is described. However, the case is not for limitation purposes. For example, the default security policy of at least one of the first default security policy set in advance with respect to the user or the second default security policy set in advance with respect to the logical printer receiving the image data transmitted from the user terminal device 20 in accordance with an instruction from the user is stored in the storage unit 16 of the information processing apparatus 10.

Then, the information processing apparatus 10 may acquire the default security policy of at least one of the first default security policy set in advance with respect to the user or the second default security policy set in advance with respect to the logical printer receiving the image data transmitted from the user terminal device 20 in accordance with an instruction from the user by reading the default security policy from the storage unit 16, and generate a new security policy from the acquired default security policy and the security policy corresponding to the attribute information. For example, priorities are set in advance on the security policy corresponding to the attribute information, the first default security policy related to the user, and the second default security policy related to the logical printer, and a new security policy is generated in accordance with the priorities set in advance.

Specifically, for example, in a case where the attribute information is information related to the installation location of the image processing apparatus 30, a new security policy is generated in accordance with priorities set in priority information 50 as illustrated in FIG. 8. In the example in FIG. 8, priorities are set in the order of the user, the logical printer, and the installation location of the image processing apparatus 30. That is, the priority of the user is set to be the highest, and the priority of the installation location of the image processing apparatus 30 is set to be the lowest. For example, it is assumed that a security policy set for each of the user, the logical printer, and the installation location of the image processing apparatus 30 is a security policy in which the instruction for the non-specifying process is defined as illustrated in FIGS. 6 and 7. In such a case, for example, it is assumed that the instruction to "conceal the name of the user" in the security policy related to the logical printer and the security policy related to the installation location of the image processing apparatus 30 is set to "OFF", and the instruction to "conceal the name of the user" in the security policy related to the user is set to "ON". In this case, the instruction to "conceal the name of the user" in a newly generated security policy is set to "ON" because a security policy related to the user having the highest priority is employed. The priorities may be set in advance, or any priorities may be set by the user.

While the exemplary embodiment is described thus far, the technical scope of the present invention is not limited to the scope disclosed in the exemplary embodiment. Various modifications or improvements may be made to the exemplary embodiment without departing from the gist of the invention, and the modified or improved exemplary embodiment also falls in the technical scope of the present invention.

The exemplary embodiment does not limit the invention according to the claims. In addition, not all combinations of features described in the exemplary embodiment are necessary for the invention. The exemplary embodiment includes various stages of the invention, and various inventions are extracted by combining plural disclosed constituents. Even in a case where several constituents are removed from all constituents illustrated in the exemplary embodiment, a configuration in which the several constituents are removed may be extracted as an invention as long as an effect is achieved.

In the exemplary embodiment, a case where the information processing program is installed in advance in the storage unit 16 is described. However, the present invention is not limited to the case. For example, the information processing program may be provided by storing the information processing program on a storage medium such as a compact disc read only memory (CD-ROM) or may be provided through a network.

In the exemplary embodiment, a case where the information processing is implemented by a software configuration using a computer by executing the program is described. However, the present invention is not limited to the case. For example, the information processing may be implemented by a hardware configuration or by combining a hardware configuration with a software configuration.

Besides, the configuration of the information processing apparatus 10 (refer to FIG. 2) described in the exemplary embodiment is one example, and it is possible to remove unnecessary parts or add new parts without departing from the gist of the present invention.

The flow of process of the information processing program (refer to FIG. 4) described in the exemplary embodiment is also one example, and it is possible to remove unnecessary steps, add new steps, or change the processing order without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive a transmission request for image data from an image processing apparatus to which a user provides an instruction to execute image processing;
acquire a security policy that includes an attribute of the image processing apparatus in a case where the transmission request is received; and
perform a control for transmitting the image data to the image processing apparatus and executing the image processing in the image processing apparatus in accordance with the acquired security policy,
wherein the attribute is an attribute information including information related to at least one of a pre-registered organization to which the image processing apparatus belongs or a relationship between the user and the image processing apparatus,
the relationship between the user and the image processing apparatus is information representing whether or not the pre-registered organization to which the image processing apparatus belongs corresponds to a pre-registered organization to which the user belongs,
wherein the information processing apparatus compares the pre-registered organization to which the image processing apparatus belongs with the pre-registered organization to which the user belongs, and
wherein in a case where the pre-registered organization to which the image processing apparatus belongs does not correspond to the pre-registered organization to which the user belongs, the acquired security policy applied in executing the image processing in the image processing apparatus is stricter than in a case where the pre-registered organization to which the image processing apparatus belongs corresponds to the pre-registered organization to which the user belongs,
the acquired security policy applied in executing the image processing in the image processing apparatus is stricter, is defined as a security policy in which a number of a non-specifying process is larger than that in a default security policy.

2. The information processing apparatus according to claim 1,
wherein the security policy is a security policy for which an instruction to perform a predetermined process for preventing at least one of the user or the image data from being specified is provided.

3. The information processing apparatus according to claim 2,
wherein the predetermined process is a process of transmitting information related to the image data to the image processing apparatus excluding specifying information that leads to specifying of at least one of the user or the image data.

4. The information processing apparatus according to claim 3,
wherein the specifying information is information that includes at least one of a name of the user or a name of the image data.

5. The information processing apparatus according to claim 2,
wherein the predetermined process is a non-specifying process of outputting a processing result of the image processing in a form in which at least one of the user or the image data is not specified.

6. The information processing apparatus according to claim 5,
wherein the non-specifying process is a process of concealing at least one of a name of the user or a name of the image data on a display unit of the image processing apparatus.

7. The information processing apparatus according to claim 2, wherein the predetermined process is a process of preventing information related to at least one of the user or the image data from being stored in the image processing apparatus.

8. The information processing apparatus according to claim 1,
wherein the processer is further configured to acquire a default security policy of at least one of a first default security policy set in advance with respect to the user or a second default security policy set in advance with respect to a logical image processing apparatus that receives the image data transmitted from the user, and
generate a new security policy from the acquired default security policy and a security policy including the attribute information.

9. The information processing apparatus according to claim 8,
wherein priorities are set on the security policy including the attribute information, the first default security policy, and the second default security policy, and
the processor is further configured to generate the new security policy in accordance with the priorities.

10. A non-transitory computer readable medium storing an information processing program causing a computer to function as:
the information processing apparatus according to claim 1.

* * * * *